United States Patent Office 2,788,223
Patented Apr. 9, 1957

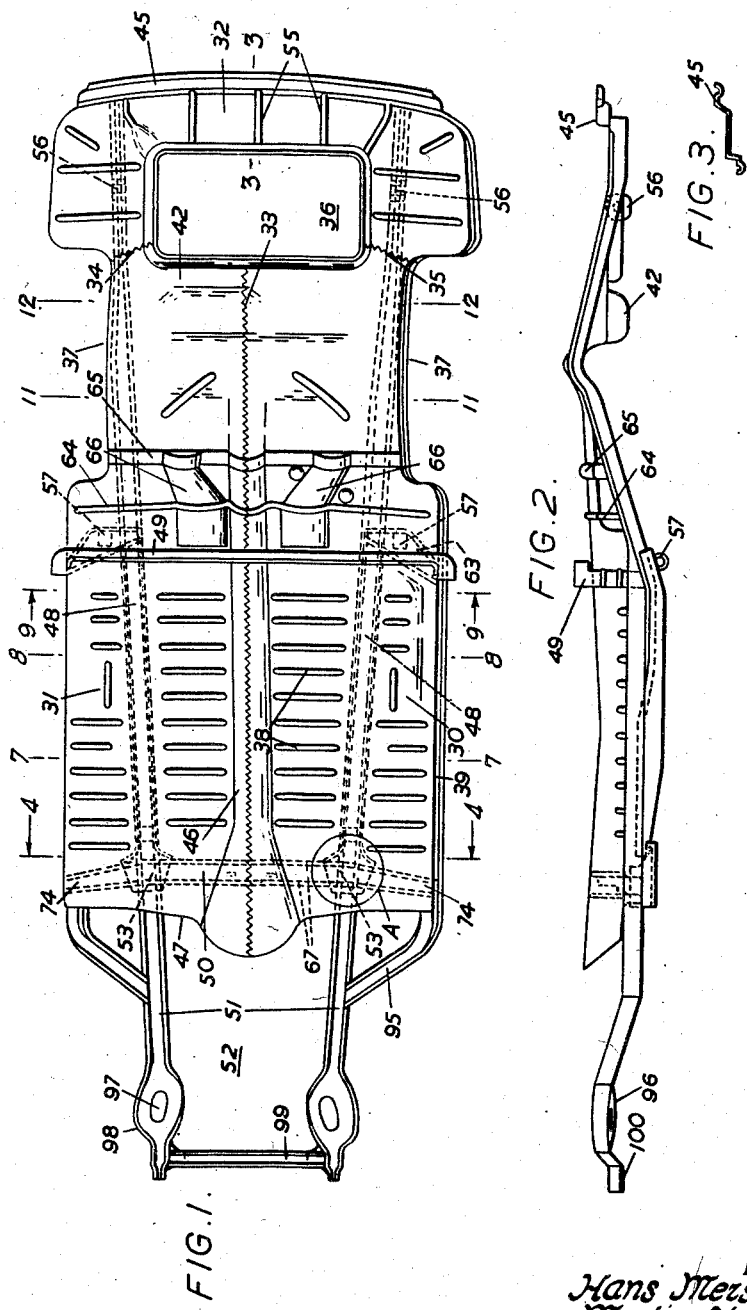

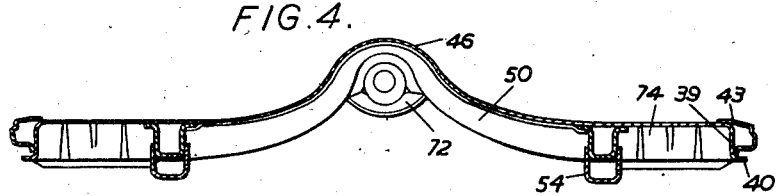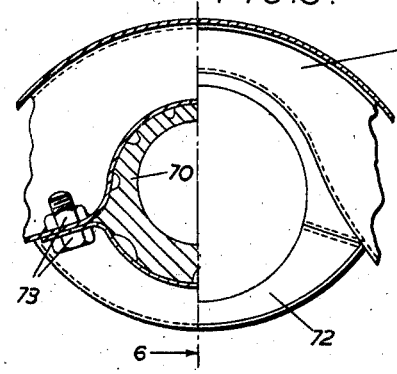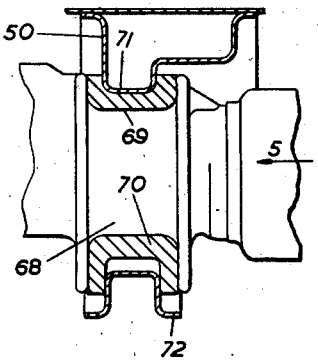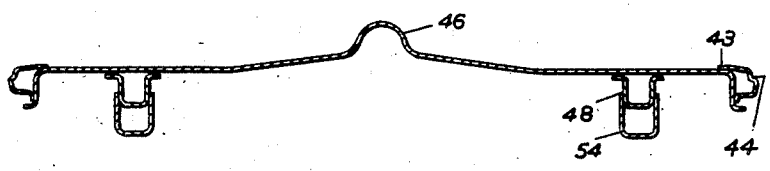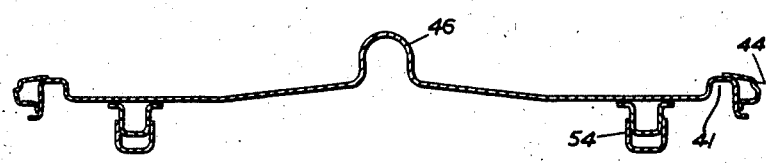

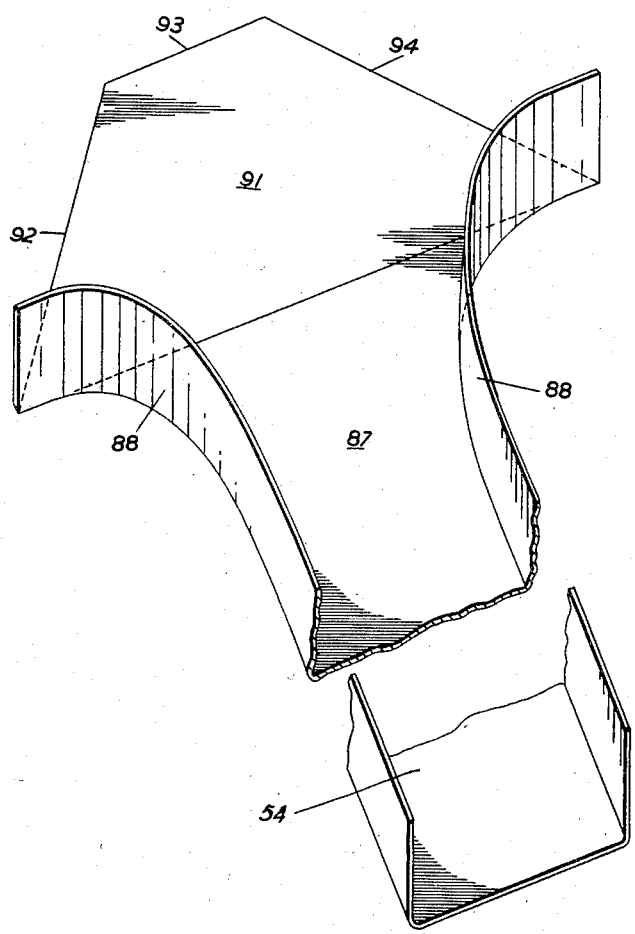

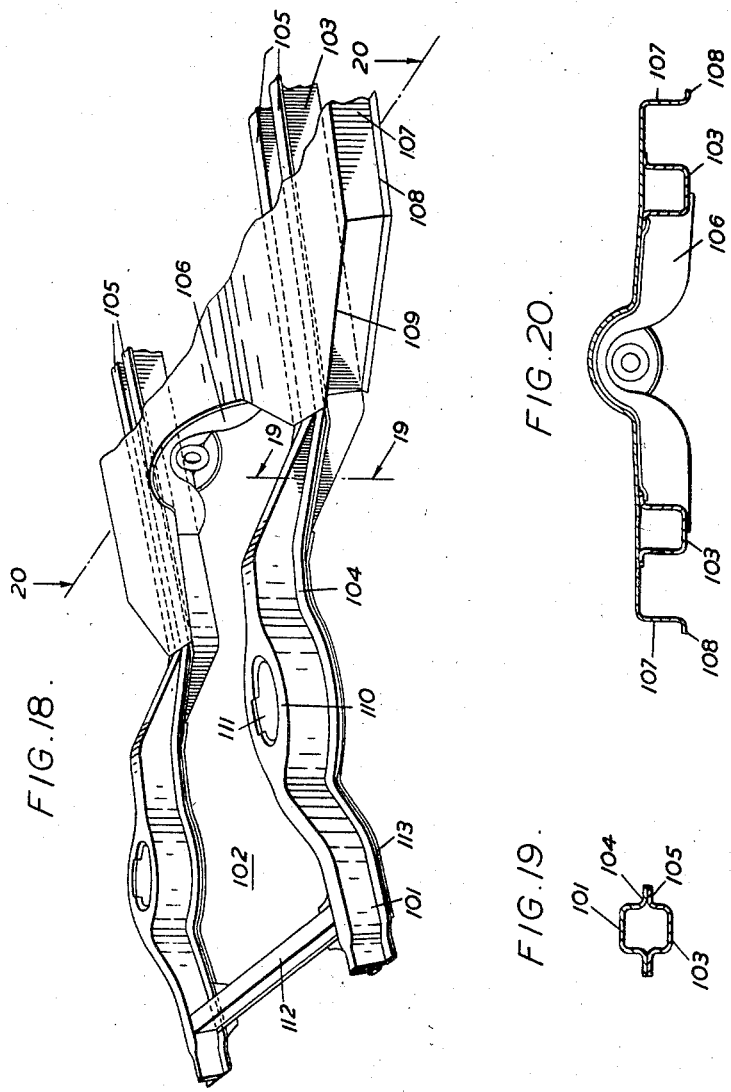

2,788,223

BASE FRAMES FOR THE SUBSTRUCTURE OF SELF-SUPPORTING VEHICLE BODIES

Hans Mersheimer, Russelsheim (Main), and Martin Heintke, Raunheim, Germany, assignors to General Motors Corporation, Detroit, Mich., a corporation of Delaware Application August 4, 1953, Serial No. 372,224

Claims priority, application Germany August 20, 1952

14 Claims. (Cl. 280—106)

The invention relates to base frames for the substructures of self-supporting vehicle bodies.

A substructure of this kind forms the foundation of a self-supporting vehicle body and is an inseparable component of the finished mounted vehicle superstructure on which the power unit the transmission mechanism and the wheel assembly or the wheel assembly groups are afterwards mounted.

Base frames for self-supporting vehicle bodies as proposed or constructed heretofore all have one basic feature in common. They consist in the main of a more or less irregularly shaped base plate which is either welded together from individual sections after shaping or is drawn direct from a single sheet.

In designing a base frame, the problem is to create a structural element able to stand up to road conditions and yet of the lightest possible weight, whilst at the same time admitting of economical manufacture in series production.

The simultaneous fulfilment of these conditions is very difficult. A light structure can only be strong if, by its shaping, it is able to withstand the stresses arising. On the other hand however, the shaping must be so simple that rational production in large numbers is possible.

A further difficulty is that such a complicated structural element as a base frame does not admit of an exact stress computation, with the result that the designer has to depend almost entirely on empirical considerations and costly tests.

In addition to the problems of strength and economical production, there are further problems arising from the dynamic stresses occurring during running, in that the engine and the unevennesses of the road give rise to vibrations which are transmitted primarily to the base frame since this, owing to its large area, tends to be the most vibration-prone structure on the vehicle. It is comparable with a diaphragm, which unless skillfully designed, intensifies the running noises.

Known base frame constructions satisfy, in the main, the first-mentioned requirements with regard to adequate strength. The considerable stiffening action of box-form cross-sections is well known and it is also well known, per se, to arrange so-called longitudinal stiffeners pair-wise in the direction of travel as well as transverse stiffeners running cross-wise to the direction of travel, these increasing the rigidity of the base frame. Known also per se is the use of corrugations or ribs pressed in the base plate to reinforce the structural unit further.

In practice heretofore, base frames were developed chiefly from the point of view of the greatest possible strength and stiffeners but the vibration effects were neglected.

The present invention has for an object to solve the problem of shaping a base frame in such a way that it not only possesses great strength to resist heavy stresses but gives very good results in it behaviour towards vibration.

In a base frame according to the present invention the effect of the construction is that natural frequencies are transposed from those ranges which are preferentially stimulated by the running of the vehicle. This is obtained by arranging that the vibration-prone surfaces are subdivided and shaped as the result of appropriate tests.

It is an important feature of the invention that between the edge stiffeners of the base plate there are provided two side members of channel section profile which, in plan, run in a substantially straight line from front to rear at a distance from the edge stiffenings and have a smaller spacing from each other at the front than at the rear of the base frame.

Further the base plate is provided in the middle with a central longitudinal stiffening in the form of a downwardly open tunnel for the transmission shaft.

A further feature of the invention may reside in the base plate being dished concavely as viewed in plan, at either side of the transmission-shaft tunnel.

Preferably the base plate is not drawn from one piece but instead several panels of sheet metal are welded together to form a large panel, which is then shaped in one operation under the press.

Further objects and individual features of the invention will be apparent from the following description, with the aid of the according drawings, of two examples of the construction.

In the drawings:

Figure 1 shows a base frame according to the invention in plan and

Figure 2 shows the base frame in side elevation.

Figure 3 is a section along line 3—3 of Figure 1 and

Figure 4 is a section through the base frame along the line 4—4, Figure 1.

Figure 5 is an enlarged detail from Figure 4, the left half showing the rear engine bearing in section and the right half being as seen in the direction of the arrow 5 in Figure 6.

Figure 6 is a section along line 6—6 of Figure 5.

Figure 7 is a section along line 7—7 of Figure 1.

Figure 8 is a section along line 8—8 of Figure 1 and

Figure 9:
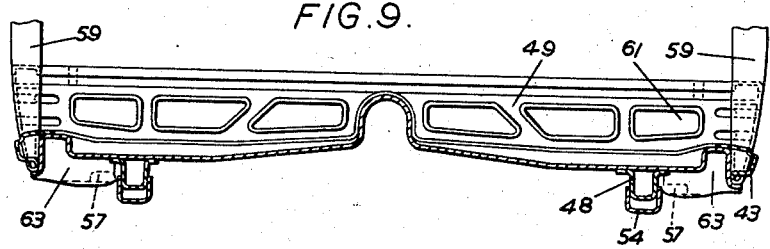
Figure 9 is a section and elevation along line 9—9 of Figure 1.
Figure 10:
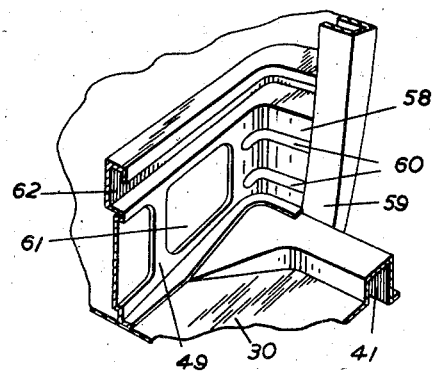

Figure 10 presents in perspective the region around the left-hand door-lock pillar showing the union of the lock-pillar with a heel plate and the base plate.

Figure 11:
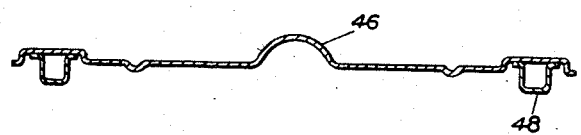

Figure 11 is a section along line 11—11 of Figure 1.

Figure 12:
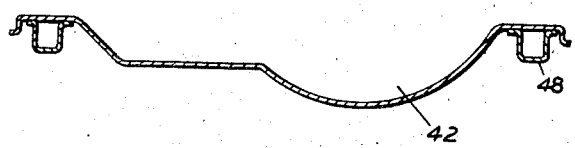

Figure 12 is a section along line 12—12 of Figure 1.

Figure 13:
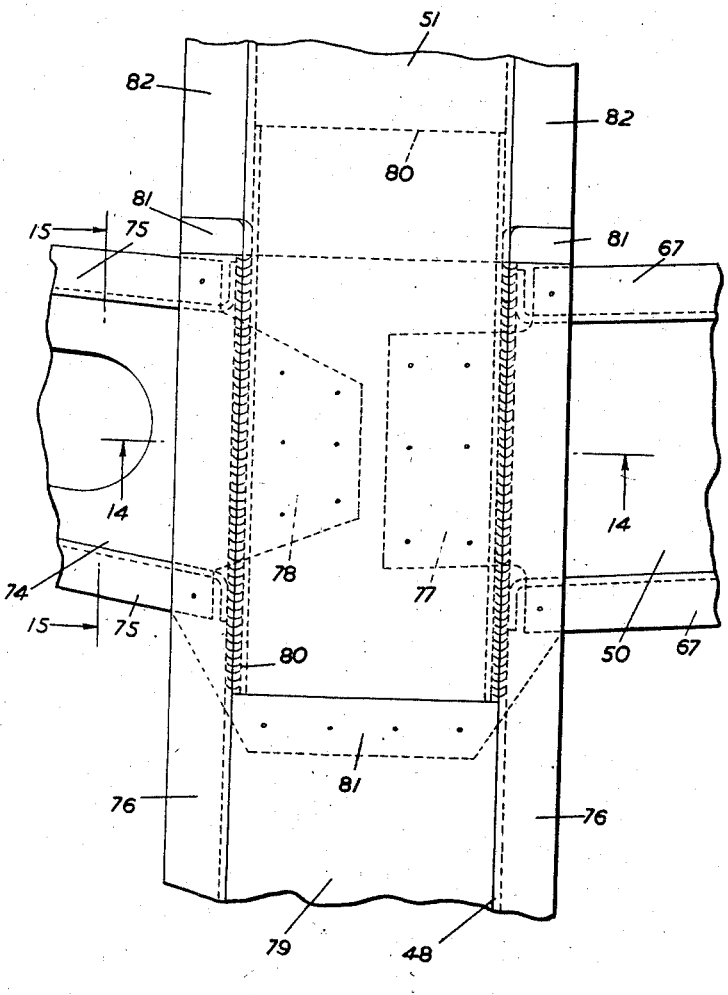

Figure 13 is an enlarged detail "A" of the left-hand intersection point in Figure 1 in plan, the base plate being omitted.

Figure 14:
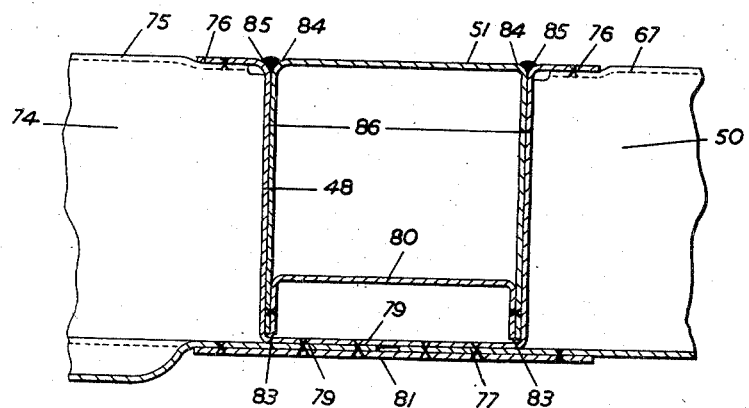

Figure 14 is a section and elevation along line 14—14 of Figure 13 and

Figure 15:
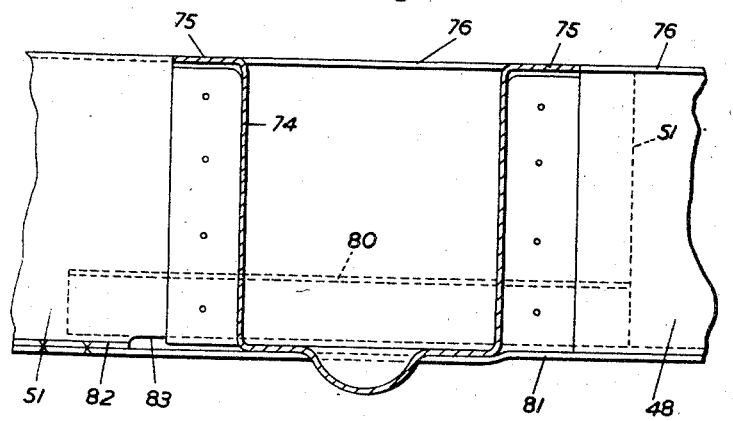

Figure 15 is a section and elevation along line 15—15 of Figure 13.

Figure 16:
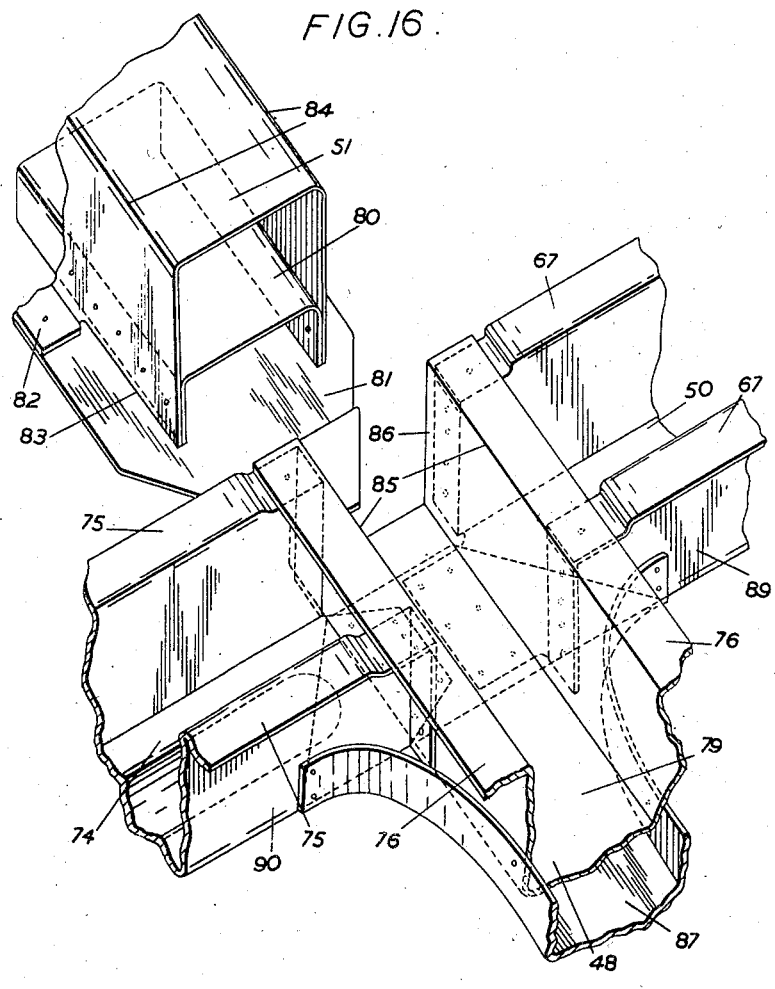

Figure 16 presents in perspective the intersection point according to the detail "A" of Figure 1 and Figure 13, the base plate being omitted and the extension side member of the front part of the frame being withdrawn.

Figure 17 is a perspective view of a detail part.

Figure 18 represents a modification of the construction according to the preceding figures.

Figure 19 is a section along line 19—19 of Figure 18 and

Figure 20 is a section along line 20—20 of Figure 18.

As Figure 1 shows, the base plate of the base frame consists of three sheet-metal panels 30, 31, 32. These panels may be flash-butt welded along the seams 33, 34 and 35. Only then is the composite plate shaped under the press and cut. In contrast to the known method in which the base plate is drawn from a single sheet, this assembly permits the use of standard, and therefore cheaper, sheet widths, provided that the arrangement of the welding seams 33, 34, 35 is skillfully carried out. At the same time there is less cutting wastage.

In the base frame illustrated the seam 33 runs along the longitudinal axis of the vehicle. The seams 34 and 35 start from an excision 36 for the fuel tank (not shown) and run obliquely forwards up to the excisions 37 for the rear wheel housing (also not shown). The seam 33 may also be executed as a roll seam. As the sheet metal panels 30 and 31 overlap, special arrangements might have to be made at the pressing tools to take into account the double thickness of sheet along the seam. It is also possible to execute the seam 33 first of all as a roll seam or butt seam, then to shape the sheet consisting of the sections 30 and 31 under the press and thereupon butt-weld it or unite it by a roll seam to the rear section 32 which is likewise finish-drawn.

The rear section 32 of the base plate forming the bottom for the luggage space is wider than the portion situated under the passenger space. In conjunction with a so-called "pontoon" coachwork this affords the possibility of providing considerable space for the luggage and passengers. A number of ribs or corrugations 38 succeeding each other in close sequence are pressed in the base plate transverse to the direction of travel. At the sides, the base plate is continuously bent at an angle downwards and outwards so as to give rise to edge stiffeners 39 with outwardly projecting horizontal flanges 40 (see Figure 4).

The section 8—8, Figures 8 and 10, indicates that the base plate is provided at the edge with a downwardly open U-shaped fold 41, which stiffens the base plate and lowers the floor in front of the rear seats thus ensuring a lower position for the centre of gravity in the occupied vehicle.

The trough 42 (Figures 1 and 12) serves to accommodate a spare wheel standing behind the back rest (not shown) of the rear seats of the vehicle. The edge of the base plate is strengthened by stamped portions 43 (Figures 4 and 7) which are attached to the edge reinforcement 39 and are of box-shaped cross-section, having a step 44 acting as a check for the vehicle doors.

At the rear end of the base frame, the base plate is given a multiple bend, so as to produce in cross-section an S-shaped profile 45 (Figure 3) which stiffens the rear end of the base plate.

A transmission-shaft tunnel 46 extends as a downwardly open arch from the front edge 47 of the base plate up to the region of the rear axle (not shown).

The side reinforcing members 48 are welded on to the underside of the base plate throughout their entire length. The extension side members 51 protruding beyond the front end of the base plate are made of thicker sheet metal and form the front frame 52 adapted to receive the front axle and the power unit. At the intersection points 53 the side members 51 and 48 are pushed into each other telescopically under the base plate and are welded together. Fuller details concerning the intersection points 53 will be given later. As the bending moment to be sustained along the side members 48 is a variable one, they must be given cross-sections which take this change in the bending moment into account.

However, in order that the side reinforcing members may be made from a sheet-metal strip with parallel rolled edges without any cutting, the development of the side member cross-sections must be kept constant.

The side members 48, viewed in plan, run in a straight line from front to rear at a distance from the edge stiffenings 39, but at the front they have a narrower spacing from each other than at the end of the base frame.

In combination with the corrugations 38 and the Cardan-shaft tunnel, which incidentally also reinforces the base frame, the vibration-prone surfaces are thereby divided up to a high degree, with the result that their natural frequencies are transposed from these ranges which are preferentially stimulated by the running of the vehicle. The side members may be reinforced by additional stamped portions 54 also of U-shape (see Figs. 4, 7, 8 and 9). In the case of closed vehicle bodies, this is generally not necessary, since in these a rigid roof drawn from sheet metal constitutes a contributory supporting member. In order that the same base frame construction may be used however for vehicles of the cabriolet type also, it is preferable if the side members 48 are reinforced by the above-mentioned U-shaped stamped portions 54.

As Figures 4 and 7 indicate, the base plate particularly at the front end, is dished concavely at either side of the tunnel 46 for the transmission shaft and falls away towards the sides of the vehicle. The base plate is thereby given an additional stiffness against static loads and its natural frequency is also raised.

The corrugations or ribs 55 of the sheet section 32 run from the cavity 36 for the fuel tank radially outwards in the direction towards the S-shaped fold 45. They stiffen the sheet section 32 serving as the floor of the luggage space and damp the vibrations arising in this region from the back spring suspension 56 (Figure 1) of the rear axle (not shown).

A considerable difficulty which presents itself to the designer is the point of attachment of the front spring suspension 57 of the rear axle. At this point the shearing and braking forces as well as the bending forces from the loading of the vehicle are taken up simultaneously. This point therefore has to satisfy considerable demands with regard to structural strength. This problem is solved by the combined action of the following parts (see Figures 1, 2 and 9, 10).

The cross member 49 (heel plate) running transverse to the direction of travel at the upper side of the base plate engages, by means of its bent-over ends 58 (Figure 10) within lock pillars 59 for the car doors and is welded to same as well as to the base plate 30.

The impressed corrugations 60 and panels 61 as well as the box-shaped upper edge 62 make the heel plate 49 particularly stiff.

In the vicinity of the lock pillars 59, the underside of the base plate is provided with a bracket 63 for the attachment of a spring bearing (Figure 1) and the bracket is welded to the lock pillars 59.

As the result of this rigid connection between the heel plate 49, the lock pillar 59, the spring-bearing attachment bracket 63 and the base plate, the forces deriving from the rear axle are not only directed over a wide area in the base frame but are also simultaneously passed through the lock pillars 59 into the part of the self-supporting body (not shown) situated above the base plate.

At a distance from the heel plate 49, two corrugations 64 and 65 are also impressed in the base plate, these extending over the entire width of the vehicle.

The two upwardly-dished parts 66 lying symmetrical to the longitudinal axis of the vehicle make it possible for an exhaust silencer (not shown) situated under the base plate to be lodged in one of said dished parts without reducing too much the ground clearance of the vehicle.

The dished parts 66 and the transmission-shaft tunnel 46 in addition to the continuous corrugations 64 and 65 in combination with the heel plate prevent the inadmissible warping and twisting of the base frame even under severe stresses.

In the front part of the base frame a second transverse stiffener 50 of U-shaped cross section (Figure 4) is provided. It is spot-welded by its flanges 67 to the underside of the base frame and follows the contour of the transmission-shaft tunnel 46 (Figures 1 and 4).

In the region of the transmission-shaft tunnel 46 the transverse stiffener 50 is formed as a mounting for the tubular end piece 68 of an engine transmission block. As will be seen in Figures 5 and 6, this transmission end piece 68 is provided with an annular groove 69, in which a rubber section 70 is placed.

The top half of this rubber section is embraced by the stamped recess 71 of the transverse stiffening 50 and the bottom half by a U-shaped stirrup 72 thus enclosing it like a bearing bush. The U-shaped stirrup 72 is detachably connected to the transverse stiffener 50 by bolts and nuts 73. At both sides of the side members 48, the transverse stiffener 50 is continued by two further cross-member extensions 74 (Figures 1 and 4) of U-shaped section up to the edge stiffeners 39 situated at the end of the base plate.

One of the two intersections (detail "A," Figure 1) which unites the side members 51 of the front frame 52 with the side members 48 under the base plate as well as with the front transverse stiffener 50 and its two cross-member extensions 74, is shown more clearly in Figures 13 to 17, the base plate being omitted.

The front cross-member 50 and the cross-member extensions 74 meet approximately at right angles the side member 48 which is also upwardly U-shaped, and are joined together along the turned-over flanges 67, 75, 76.

The cross-member 50 and the cross-member extensions 74 each have their bottom faces prolonged to form lugs 77 and 78 which are spot-welded to the bottom 79 of the side member 48.

The downwardly open U-shaped extension member 51 of the front frame 52 is reinforced in the region of the intersection 53 by a U-shaped angle piece 80. Further, the side member 51 of the front frame 52 is closed in downward direction over its entire length by a cover plate 81 to provide an enclosed box-form section.

Now in order that the side member 51 of the front frame 52 may be pushed telescopically into the side member 48 under the base plate, its horizontally bent-over flanges 82 are cut away in the region of the intersection in such a way that a space the size of a sheet thickness is formed between the bottom edges 83 of the front frame side member 51 and the cover plate 81.

During the assembly of the front frame 52, the side member 51 is pushed telescopically into the intersection, the bottom edges 83 sliding on the bottom 79 of the side member 48. The cover plate 81 at the same time rests on the lugs 77 and 78 on the underside of the bottom 79 of the side member and is spot-welded to these lugs and to the bottom 79. At its upper edges 84, the side member 51 is welded to the flange edges 85 or to the webs 86 of the side member 48. The bottom plate 30 is placed on the intersection thus preassembled, and is spot-welded on to it along the flanges 67, 75, 76. In the case of closed body constructions, this union has great rigidity and admits of rational methods of production.

Now in order that the union may be strengthened, for reasons already mentioned, in cars of the cabriolet type, the joint may be enveloped from below by a shoe 87 (Figures 16 and 17) after the manner of a gusset plate. It is at the same time expedient to make the shoe in one piece with the U-shaped side member reinforcements 54 of Figures 4, 7 and 8. The shoe 87, acting as a gusset plate, is flared for this purpose at its forward end, the flanges 88 running in an arch towards the side walls 89 and 90 of the cross-member 50 and the cross-member extension 74 and being welded to same.

The widened front base 91 of the shoe 87 rests against the underside of the intersection and is welded along its edges 92, 93, 94 to the cover plate 81 of the front frame side member 51.

The cross-member extensions 74 are welded to the edge stiffeners 39 and to the stays 95 of U-shaped section (Figure 1).

The stays 95 run forwards at the inside of the edge stiffeners 39 and at the underside of the base plate and are bent over at an obtuse angle in such a way that they meet the forwardly protruding side members 51 of the front frame 52 to which they are likewise welded.

The stays 95 form, as it were, a continuation of the cross-member extensions 74 and of the edge stiffeners 39 and impart a considerable rigidity to the front frame 52.

As Figure 2 indicates, the side members 51 have an upturned bend 96. The oval or possibly circular aperture 97 in the widening 98 serves to allow parts of a front axle springing system e. g., the helical springs and the telescopic shock absorbers, to pass through.

At the front end, the side members 51 of the front frame 52 are joined together by a cross-member 99 of U-shaped cross-section. The cross member 99 is closed in to form a box girder in the usual way by a cover plate 100.

Figures 18 to 20 illustrate a modification of the front part of the base frame.

The extension side members 101 of this front frame 102 are made of downwardly open U-shaped pressings and are joined by spot-welding to the upwardly open U-shaped side reinforcing members 103 running under the base plate, the junction being made along the laterally folded flanges 104 and 105.

In this case the profile depth of the forward extension side members 101 decreases towards the base plate to the same extent that the profile depth of the main reinforcing side members 103 diminishes towards the front (see also Figure 19) so that in the region of the joint the front frame 102 has the same depth of cross-section everywhere. Compared with the construction of the front part according to Figures 1 and 2, this results in a still simpler and easier mounting of the front frame 102 and the flow of force is transferred under the base plate from the side members 101 made of thicker sheet, over a wide area along the bent-over flanges 104 and 105 into the side members 103 made of thinner sheet.

The cross-member 106, Figure 18, providing a mounting for a tubular end piece for the transmission, is arranged between the side members 103 just as in the previous example according to Figure 4, but the cross-member extensions 74 and the stays 95 of Figure 1 are dispensed with in order to obtain a particularly light construction. Instead, the edge stiffeners 107 with the outwardly turned horizontal flanges 108 are continued along the forward base plate edge 109 which runs obliquely inwards, until they reach the side members 103 where they are firmly secured.

The wide extensions 110 with the oval or circular openings 111, and also the front cross-member 112, are executed in the same manner as described above with the air of Figures 1 and 2.

The extension side members 101 of the front frame 102 (Figure 18) are closed off below to form a box structure by means of cover plates 113 which are spot-welded along the flanges 104 just as in the case of the first example.

While we have shown what we consider to be preferred embodiments of our invention, it will be understood that various modifications and rearrangements may be made therein without departing from the spirit and scope of the invention.

We claim:

1. Base frame for the substructure of a self-supporting vehicle body, comprising a pressed sheet metal base plate with downwardly bent reinforcing edges; a pair of spaced side reinforcing members, each spaced from a respective one of said reinforced edges, said members extending longitudinally from the front to the rear of said base plate in substantially straight lines as viewed in plan, said members approaching progressively closer to each other from the rear end of the frame to the front end, and each said member being of upwardly open channel section and welded to the underside of said base plate; central reinforcing means in the form of a downwardly open transmission-shaft tunnel which extends between said side reinforcing members at least over the front half of the base plate, and is pressed out of said plate; and a transverse stiffening member in the region of the front of said tunnel, said transverse member being welded to said side reinforcing members and to the underside of the base plate and being centrally curved to follow the profile of said tunnel.

2. Base frame for the substructure of a self-supporting vehicle body, comprising a pressed sheet metal base plate with bent reinforcing edges; a pair of spaced side reinforcing members, each spaced from a respective one of said reinforced edges, said members extending longitudinally from the front to the rear of said base plate in substantially straight lines as viewed in plan, said members approaching progressively closer to each other from the rear end of the frame to the front end, and each said member being of upwardly open channel section and welded to the underside of said base plate; central reinforcing means in the form of a downwardly open transmission-shaft tunnel which extends between said side reinforcing members at least over the front half of the base plate, and is pressed out of said plate; and front extension members which form extensions of said side reinforcing members forward of the front end of the base plate.

3. Base frame for the substructure of a self-supporting vehicle body, comprising a pressed sheet metal base plate with downwardly bent reinforcing edges; a pair of side reinforcing members of upwardly-open channel section welded to the underside of said plate and extending longitudinally from the front to the rear thereof in substantially straight lines as viewed in plan, said members also being mutually convergent from rear to front of the frame and having extensions which continue them forward of the front end of said base plate; and central reinforcing means in the form of a downwardly open transmission-shaft tunnel which extends between said side reinforcing members at least over the front half of the base plate, and is pressed out of said plate.

4. Base frame for the substructure of a self-supporting vehicle body, comprising a metal base plate formed of two panels welded together along a central longitudinal line and a third panel welded to the rear of said two panels along a transverse line, said plate having pressed out of it a downwardly open transmission-shaft tunnel along which runs said longitudinal welding line and also having downwardly bent reinforcing edges, said plate being concavely shaped as viewed in plan between said tunnel and each reinforcing edge; a pair of longitudinal side reinforcing members of upwardly-open channel section welded to the underside of said plate on either side of said tunnel and having front extensions which continue said members forward of the plate, said members including the front extensions thereof being substantially straight as viewed in plan and being mutually convergent in the forward direction; transverse pressed-out ribs in the base plate which extend substantially across the whole width of said plate except for interruptions in the region of said tunnel and said side reinforcing members; a front transversely extending stiffening member in the region of the front end of said tunnel, said transverse member being welded to said side reinforcing members and to the underside of the base-plate and being centrally curved to follow the profile of said tunnel.

5. Base frame for the substructure of a self-supporting vehicle body, comprising a metal base plate formed of two panels welded together along a central longitudinal line and a third panel welded to the rear of said two panels along a transverse line, said plate having pressed out of it a downwardly open transmission-shaft tunnel along which runs said longitudinal welding line and also having downwardly bent reinforcing edges, said plate being concavely shaped as viewed in plan between said tunnel and each reinforcing edge; a pair of longitudinal side reinforcing members of upwardly-open channel section welded to the underside of said plate on either side of said tunnel and having front extensions which continue said members forward of the plate, said members including the front extensions thereof being substantially straight as viewed in plan and being mutually convergent in the forward direction; transverse pressed-out ribs in the base plate which extend substantially across the whole width of said plate except for interruptions in the region of said tunnel and said side reinforcing members; a front transversely extending stiffening member in the region of the front end of said tunnel, said transverse member being welded to said side reinforcing members and to the underside of the base-plate and being centrally curved to follow the profile of said tunnel; said third panel of the base plate being wider than the combined width of said two panels and having a central cut-out aperture from which radiate stiffening ribs pressed out of said third panel.

6. Base frame for the substructure of a self-supporting vehicle body, comprising a pressed sheet metal base plate with downwardly bent reinforcing edges; a pair of spaced side reinforcing members, each spaced from a respective one of said reinforced edges, said members extending longitudinally from the front to the rear of said base plate in substantially straight lines as viewed in plan, said members being closer to each other at the front end of the frame than at the rear end, and each said member being of upwardly open channel section and welded to the underside of said base plate; and central reinforcing means in the form of a downwardly open transmission-shaft tunnel which extends between said side reinforcing members at least over the front half of the base plate, and is pressed integrally out of said plate, said base plate being laterally cut out at the rear end to provide wheel recesses, that portion of the base plate behind said recesses being of greater width than the front portion of said plate.

7. Apparatus of the character claimed in claim 6, wherein that portion of the base plate behind the said wheel recesses comprises a cut-out opening to receive a fuel tank and has pressed-out stiffening ribs extending radially from said opening towards the edge of the base plate.

8. Apparatus of the character claimed in claim 6, including a transverse rear reinforcing member extending across the base plate and welded thereto forward of said wheel recesses, and sheet metal spring attachment pressings, welded to the base plate one on each side, located in the vicinity of said transverse member and extending inwardly from the reinforcing edge of the base plate to said side reinforcing members, to which latter the spring attachment pressings are also welded.

9. Base frame for the substructure of a self-supporting vehicle body, comprising a pressed sheet metal base plate with downwardly bent reinforcing edges, a pair of spaced side reinforcing members, each spaced from a respective one of said reinforced edges, said members extending longitudinally from the front to the rear of said base plate in substantially straight lines as viewed in plan, said members being closer to each other at the front end of the frame than at the rear end, and each said member being of upwardly open channel section and welded to the underside of said base plate; and central reinforcing means in the form of a downwardly open transmission-shaft tunnel which extends between said side reinforcing members at least over the front half of the base plate, and is pressed integrally out of said plate, said base plate being formed with transverse ribs which extend across the entire width of the floorboard apart from interruption in the region of the transmission-shaft tunnel and the side reinforcing members.

10. Base frame for the substructure of a self-supporting vehicle body, comprising a pressed sheet metal base plate with downwardly bent reinforcing edges; a pair of spaced side reinforcing members, each spaced from a respective one of said reinforced edges, said members extending longitudinally from the front to the rear of said base plate in substantially straight lines as viewed in plan, said members being closer to each other at the front end of the frame than at the rear end, and each said member being of upwardly open channel section and welded to the underside of said base plate; central reinforcing means in the form of a downwardly open transmission-shaft tunnel which extends between said side reinforcing members at least over the front half of the base plate, and is pressed integrally out of said plate; a transversely extending forward reinforcing member formed by an upwardly open channel section pressing extending between said side reinforcing members, and welded thereto and also to the underside of the base plate, said transverse forward reinforcing member being bent to a downwardly open curve to follow the contour of the transmission-shaft tunnel; and a shell member which is separately attached below said downwardly open curve and forms with it a ring element adapted to receive and locate an engine transmission block.

11. Apparatus of the character claimed in claim 10, wherein said transverse forward reinforcing member is laterally continued on each side by an upwardly open channel section pressing, which extends between the adjacent side reinforcing member and the adjacent reinforced edge of the base plate, and is welded to both said adjacent members.

12. Base frame for the substructure of a self-supporting vehicle body, comprising a pressed sheet metal base plate with downwardly bent reinforcing edges; a pair of spaced side reinforcing members, each spaced from a respective one of said reinforced edges, said members extending longitudinally from the front to the rear of said base plate in substantially straight lines as viewed in plan, said members being closer to each other at the front end of the frame than at the rear end, and each said member being of upwardly open channel section and welded to the underside of said base plate; central reinforcing means in the form of a downwardly open transmission-shaft tunnel which extends between said side reinforcing members at least over the front half of the base plate, and is pressed integrally out of said plate, said side reinforcement members having forward extensions; and a box section forward stay on each side of the forward end of said base plate, said stays being inwardly bent towards said extensions of the side reinforcing members and being welded at one end to the said extensions and at the other end to the reinforcing edge of the base plate.

13. Apparatus of the character claimed in claim 12, wherein said forward extensions are made of downwardly open channel section pressings, which are telescoped into the forward ends of the side reinforcing members and secured thereto by welding.

14. Apparatus of the character claimed in claim 13 wherein said forward extensions each having a flattened portion formed with an opening adapted to receive parts of the front suspension of the vehicle.

References Cited in the file of this patent

UNITED STATES PATENTS

| | | |
|---|---|---|
| 2,025,065 | Menton | Dec. 24, 1935 |
| 2,100,561 | Kliesrath | Nov. 30, 1937 |
| 2,240,022 | Saives | Apr. 29, 1941 |
| 2,268,291 | Ledwinka | Dec. 30, 1941 |
| 2,292,646 | McIntosh | Aug. 11, 1942 |